US008265407B2

(12) United States Patent
Kim et al.

(10) Patent No.: US 8,265,407 B2
(45) Date of Patent: Sep. 11, 2012

(54) METHOD FOR CODING AND DECODING 3D DATA IMPLEMENTED AS A MESH MODEL

(75) Inventors: Soo-Kyun Kim, Seoul (KR); Sang-Wook Oh, Ansan-si (KR); Byung-Jun Son, Seoul (KR); Tae-Hwa Hong, Seoul (KR); Sung-Dae Cho, Yongin-si (KR); Hae-Young Lee, Seoul (KR); Dae-Young Kim, Seongnam-si (KR); Sung-Yeol Lee, Seoul (KR); Nak-Kwon Lim, Seoul (KR)

(73) Assignees: Samsung Electronics Co., Ltd (KR); Hongik University Industry-Academia Cooperation Foundation (KR)

( * ) Notice: Subject to any disclaimer, the term of this patent is extended or adjusted under 35 U.S.C. 154(b) by 872 days.

(21) Appl. No.: 12/371,134

(22) Filed: Feb. 13, 2009

(65) Prior Publication Data
US 2009/0202160 A1    Aug. 13, 2009

(30) Foreign Application Priority Data

Feb. 13, 2008   (KR) .................. 10-2008-0013214

(51) Int. Cl.
*G06K 9/36* (2006.01)
(52) U.S. Cl. ...................................... 382/240
(58) Field of Classification Search .................. 382/154, 382/241, 243; 345/419–420, 423–424, 427
See application file for complete search history.

(56) References Cited

U.S. PATENT DOCUMENTS

| 5,903,682 | A | 5/1999 | Chun |
| 6,563,500 | B1 | 5/2003 | Kim et al. |
| 6,577,310 | B1 * | 6/2003 | Kim et al. ..................... 345/427 |
| 6,668,091 | B1 * | 12/2003 | Kim et al. ..................... 382/243 |

FOREIGN PATENT DOCUMENTS

| KR | 100215450 | 5/1999 |
| KR | 1020000016872 | 3/2000 |

* cited by examiner

*Primary Examiner* — Jose Couso
(74) *Attorney, Agent, or Firm* — The Farrell Law Firm, P.C.

(57) ABSTRACT

A method for coding three-dimensional (3D) data, and more particularly for coding geometry data included in the 3D data. The method includes: generating a bounding box including a vertex of the 3D data based on information included in the geometry data; dividing the bounding box into a plurality of partitions having an equal size; identifying a number of vertices included in each divided partition; appointing a divided partition as a leaf cell based on the identified number of vertices; and coding the geometry data using information on the dividing of the bounding box, information on vertices included in each divided partition, and information indicating the position of a vertex included in the leaf cell, when a divided partition is subdivided.

14 Claims, 8 Drawing Sheets

FIG.6A

| a | b | c | d |
|---|---|---|---|
| 0 | 1 | 1 | 1 |

FIG.6B

| b1 | b2 | b3 | b4 |
|---|---|---|---|
| 0 | 0 | 0 | 0 |

POSITION INFORMATION

| 1 | 1 |
|---|---|

| c1 | c2 | c3 | c4 |
|---|---|---|---|
| 1 | 0 | 0 | 0 |

| d1 | d2 | d3 | d4 |
|---|---|---|---|
| 0 | 1 | 0 | 0 |

FIG.6C

| c11 | c12 | c13 | c14 |
|---|---|---|---|
| 1 | 0 | 0 | 1 |

| d21 | d22 | d23 | d24 |
|---|---|---|---|
| 0 | 1 | 1 | 0 |

FIG.6D

| c111 | c112 | c113 | c114 |
|---|---|---|---|
| 0 | 0 | 0 | 0 |

POSITION INFORMATION

| 1 | 1 |
|---|---|

| c141 | c142 | c143 | c144 |
|---|---|---|---|
| 0 | 0 | 0 | 0 |

| 0 | 0 |
|---|---|

| d221 | d222 | d223 | d224 |
|---|---|---|---|
| 0 | 0 | 0 | 0 |

| 1 | 0 |
|---|---|

| d231 | d232 | d233 | d234 |
|---|---|---|---|
| 0 | 0 | 0 | 0 |

| 0 | 1 |
|---|---|

METHOD FOR CODING AND DECODING 3D DATA IMPLEMENTED AS A MESH MODEL

PRIORITY

This application claims priority to an application entitled "Method for Coding and Decoding 3D Data Implemented as Mesh Model" filed in the Korean Industrial Property Office on Feb. 13, 2008 and assigned Ser. No. 10-2008-0013214, the content of which is hereby incorporated by reference.

BACKGROUND OF THE INVENTION

1. Field of the Invention

The present invention relates generally to a method for coding and decoding three-dimensional data expressed by a mesh model, and more particularly to a method for coding and decoding geometry data included in the three-dimensional data.

2. Description of the Related Art

In general, three-dimensional (3D) data expressed by a mesh model includes fundamental data, such as geometry information and connectivity information within a space, and also includes attribute information, such as vertices, colors of faces, normal vectors, and information for texture mapping. Also, for a precise (or highly detailed) 3D model, in addition to the attribute information, information on irregular distribution of points and any connectivity between points in a space is also included, usually creating a large amount of data.

However, a mobile device having a small amount of system resources (i.e., a small-capacity operation performance capability and a small storage capacity, e.g., memory) receives data through transmission channels with limited resources, and thus has a limited capability of processing data by itself. For this reason, a mobile device cannot code and decode a large amount of 3D data, i.e., a precise 3D model, using conventional methods. Accordingly, it is necessary to develop a new 3D data coding and decoding method suitable for a mobile device, which uses a smaller amount of system resources.

SUMMARY OF THE INVENTION

Accordingly, the present invention has been designed to solve at least the above-mentioned problems occurring in the prior art, and provides a coding method for efficiently reducing the size of 3D data, and a decoding method for reliably decoding the reduced size coded data.

In accordance with an aspect of the present invention, there is provided a method for coding three-dimensional (3D) data, and more particularly for coding geometry data included in the 3D data. The method includes generating a bounding box including a vertex forming the 3D data, based on information included in the geometry data; dividing the bounding box into a plurality of partitions having equal size; identifying a number of vertices included in each divided partition; appointing a divided partition as a leaf cell based on the identified number of vertices; and coding the geometry data using information on the division of the bounding box, information on the vertices included in each divided partition, and information indicating a position of a vertex included in the leaf cell.

In accordance with another aspect of the present invention, there is provided a method for decoding geometry data included in three-dimensional (3D) data expressed by a mesh model. The method includes decoding a bounding box generated in a coding process; identifying information on division of the bounding box; identifying whether a specific partition has been divided into a lower level or corresponds to a leaf cell; subdividing a specific partition which has been divided into the lower level; restoring a vertex included in the leaf cell, based on information indicating a position of the vertex included in the leaf cell; and restoring the geometry data based on information on a vertex included in each divided partition and a position of each divided partition.

In accordance with yet another aspect of the present invention, there is provided a method for coding geometry data included in three-dimensional (3D) data expressed by a mesh model, and decoding the geometry data coded based on the coding method. The coding method includes generating a bounding box including a vertex forming the 3D data, based on information included in the geometry data; dividing the bounding box into a plurality of partitions having equal size; identifying a number of vertices included in each of the divided partitions; appointing a divided partition as a leaf cell based on the identified number of vertices; and coding the geometry data using information on the division of the bounding box, information on the vertices included in each divided partition, and information indicating a position of the vertex included in the leaf cell. The decoding method includes decoding the bounding box; identifying the information on the division of the bounding box; identifying whether a specific partition has been divided into a lower level or corresponds to the leaf cell; subdividing a specific partition which has been divided into the lower level; restoring the vertex included in the leaf cell, based on the information indicating the position of the vertex included in the leaf cell; and restoring the geometry data based on the information on the vertex included in each of the divided partitions and the positions of each of the divided partitions.

BRIEF DESCRIPTION OF THE DRAWINGS

The above and other aspects, features, and advantages of the present invention will be more apparent from the following detailed description taken in conjunction with the accompanying drawings, in which:

FIGS. 6A to 6D are views illustrating results of coding each cell illustrated in FIGS. 5A to 5D.

DETAILED DESCRIPTION OF EMBODIMENTS OF THE INVENTION

Hereinafter, embodiments of the present invention will be described with reference to the accompanying drawings. In the description below, many particular items are shown, but these are given only for providing a general understanding of the present invention, and it will be understood by those skilled in the art that various changes in form and detail may be made within the scope of the present invention.

In accordance with an embodiment of the present invention, a method for coding and decoding 3D data expressed by a mesh model according to the present invention efficiently codes a large amount of three-dimensional (3D) data, and enables a portable terminal, which is incapable of supporting a large number of operations, to easily decode the coded 3D data. Therefore, the coding of 3D data is applicable to an electronic apparatus, e.g., a desktop computer or server, which has an external input device or communication device capable of receiving a large amount of data. In addition, the decoding of efficiently the coded 3D data is applicable to a portable terminal, which cannot support a large number of operations, e.g., a digital camera, a Personal Digital Assistant (PDA), a smart phone, a Portable Multimedia Player (PMP), or a mobile communication terminal.

The method for coding, as will be described below, is applied to an apparatus for coding and decoding 3D data as proposed in the MPEG-4 Standard. However, the present invention is no limited thereto, and may also be used in any other device capable of dividing a bounding box and coding and decoding geometry data.

Figure 1:
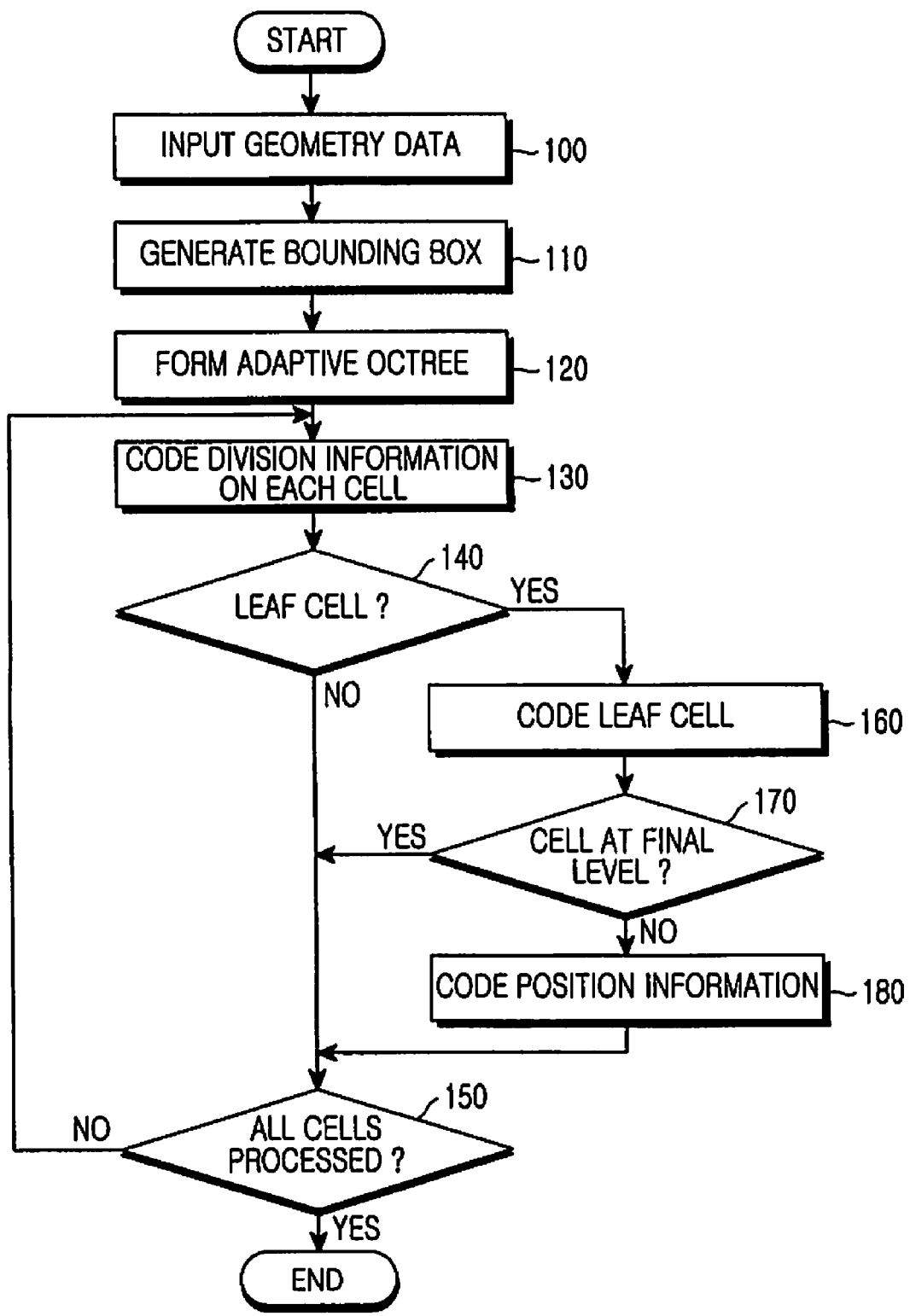
FIG. 1 is a flowchart illustrating a method for coding 3D data according to an embodiment of the present invention.

FIG. 1 is a flowchart illustrating a method for coding 3D data according to an embodiment of the present invention. In step 100, geometry data included in 3D data is input. For example, in step 100, geometry data may be extracted from a data file in a wrl format, which includes information on the geometry data and connectivity data included in 3D data expressed by a mesh model, and then is then input.

In step 110, a bounding box is generated, which is capable of including all vertices included in the geometry data, which has been input in step 100.

Figure 2:
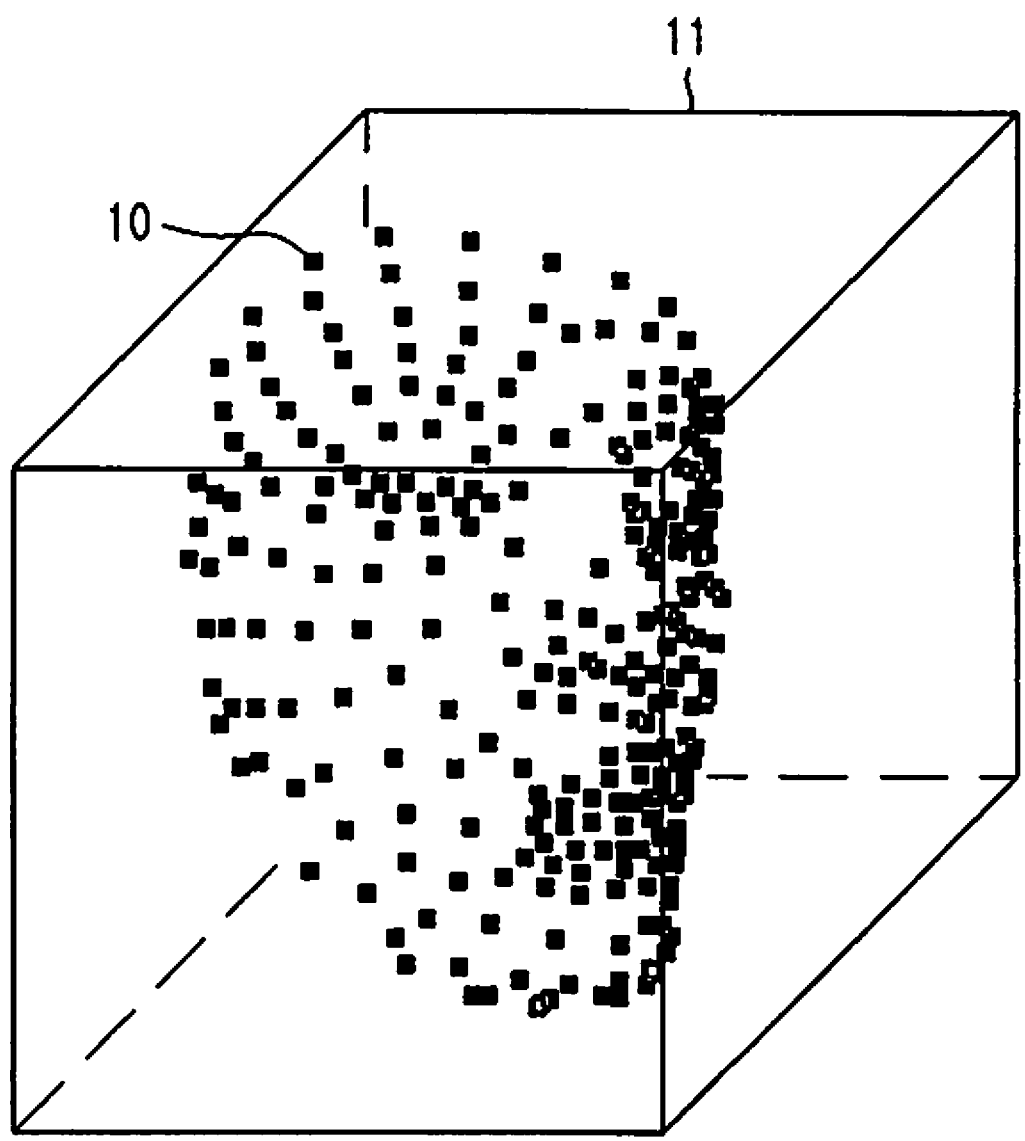
FIG. 2 is a view illustrating a bounding box according to an embodiment of the present invention.

FIG. 2 illustrates an example of a bounding box according to an embodiment of the present invention. Referring to FIG. 2, for example, vertices 10 included in the geometry data may be input in step 100, and a bounding box 11 may be generated in step 110. It is preferred that the bounding box 11 is formed in a size capable of including all vertices 10 included in the geometry data.

Referring back to FIG. 1, in step 120, an octree is generated by dividing the bounding box 11 into eight partitions of equal size. In addition, in step 120, the octree generation is preferably repeated until each divided partition includes only one or no vertex, thereby forming an adaptive octree.

Although an embodiment of the present invention is described below with reference to the bounding box 11, which is divided into eight portions of equal size and defined as an octree, the present invention should not be limited thereto. That is, the number by which the bound box is divided may vary, but should still be divided into equal size partitions.

Figure 3:
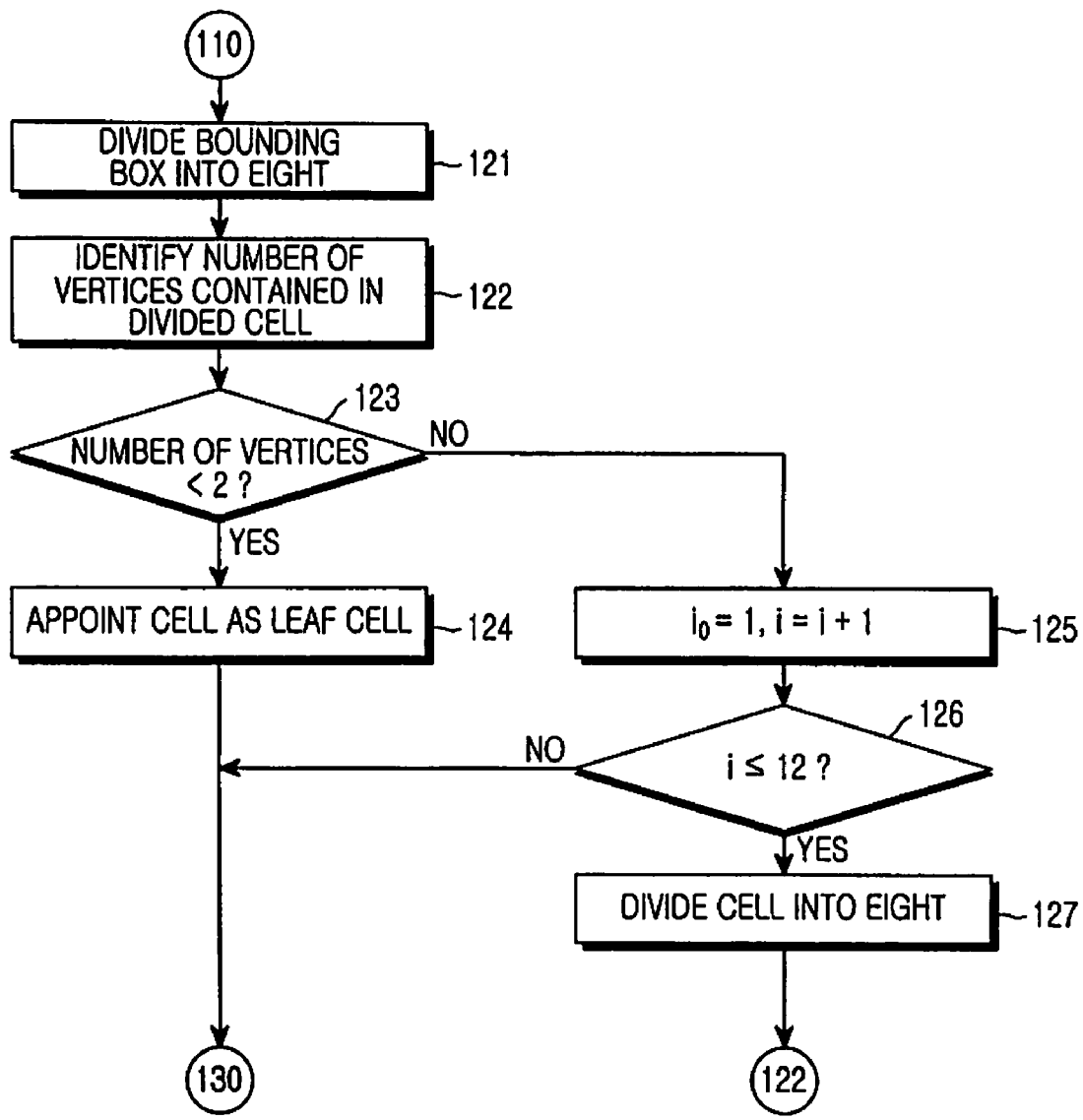
FIG. 3 is a flowchart illustrating the process of step 120, as illustrated in FIG. 1, according to an embodiment of the present invention.

FIG. 3 is a flowchart illustrating step 120 (i.e., the step of forming an adaptive octree) in more detail, according to an embodiment of the present invention.

Referring to FIG. 3, in step 121, the bounding box 11 is divided into eight partitions of equal size. In step 122, the number of vertices included in each of the eight cells obtained through the division is identified. In step 123, when it is determined that a cell includes two or more vertices, the procedure for that cell proceeds to step 127, and when it is determined that a cell includes less than two vertices, i.e., one or no vertex, the procedure for that cell proceeds to step 124.

In step 124, a cell including exactly one or no vertex is appointed as a leaf cell. However, in step 127, a cell including two or more vertices is further subdivided into eight partitions of equal size. Accordingly, steps 122, 123, and 127 are continuously repeated until each cell includes only one or no vertex, thereby forming an adaptive octree.

It is noted, however, that in implementation, a predetermined number of octree generation iterations are usually sufficient to identify the positions of most vertices within an acceptable margin of error. Therefore, in order to preserve system resources it is often preferable to limit the number of octree generation iterations. Accordingly, actually repeating the process of dividing a cell until each cell includes only one or no vertex, steps, such as 125 and 126, for limiting the number of octree generation iterations may be performed.

According to an alternative embodiment of the present invention, the number of octree generation iterations may be limited to, for example, twelve. For example, referring to FIG. 3, the number of octree generation iterations (i) is counted in step 125, and it is determined if the number of octree generation iterations exceeds a predetermined number of iterations, e.g., twelve, in step 126. If the number of octree generation iterations is equal to or less than twelve as a result of the determination of step 126, the octree generation is iterated, i.e., the cell is divided into eight cells, in step 127, and if the number of octree generation iterations exceeds twelve, the octree generation is not performed any more and the process continues to step 130.

Referring back to FIG. 1, in step 130, the division information on each cell obtained through the division in step 120 is coded. In step 140, it is determined if the cell whose information is being coded is a leaf cell. If the cell is not a leaf cell, step 150 is performed, and if the cell is a leaf cell, step 160 is performed.

In step 150, it is determined if the coding of all cells obtained through the division has been completed. Thereafter, step 130 is again performed for a cell that has not been completely coded, and the coding operation is finished when all of the cells have been completely coded.

In step 160, i.e., when a cell is a leaf cell, the coding of the leaf cell is performed. Thereafter, in step 170, it is determined if a cell identified as a leaf cell is a cell included in "a final dividing level", i.e., a cell in the final level of dividing. A cell in a final dividing level is a cell divided to a level at which no other cells will be divided more. For example, referring to FIG. 5A, after a bounding box is divided into four cells a, b, c, and d, cell b includes a single vertex, and is therefore, a leaf cell. However, because cells c and d each include 2 vertices and must be further divided in order to create cells including only 1 vertex (or a predetermined number of iterations has not been performed), then cell b is not in a final dividing level. However, referring to FIG. 5C, if it is assumed that the dividing of cells is completed at this point, i.e., when cells c11, c14, d22, and dd23 each include only one vertex, then these cells would be considered leaf cells as they include only one vertex each, and would be at the final dividing level because no more cell division would be occurring for the bounding box.

If the cell identified as a leaf cell corresponds to a cell included in a final dividing level, then the process proceeds to step 150. However, if the cell identified as a leaf cell is not in a final dividing level, in step 180, position information is inserted into the code, and then the process proceeds to step 150. The process of inserting position information will be described in more detail with reference to FIGS. 5A-5D and 6A-6D.

Figure 4:
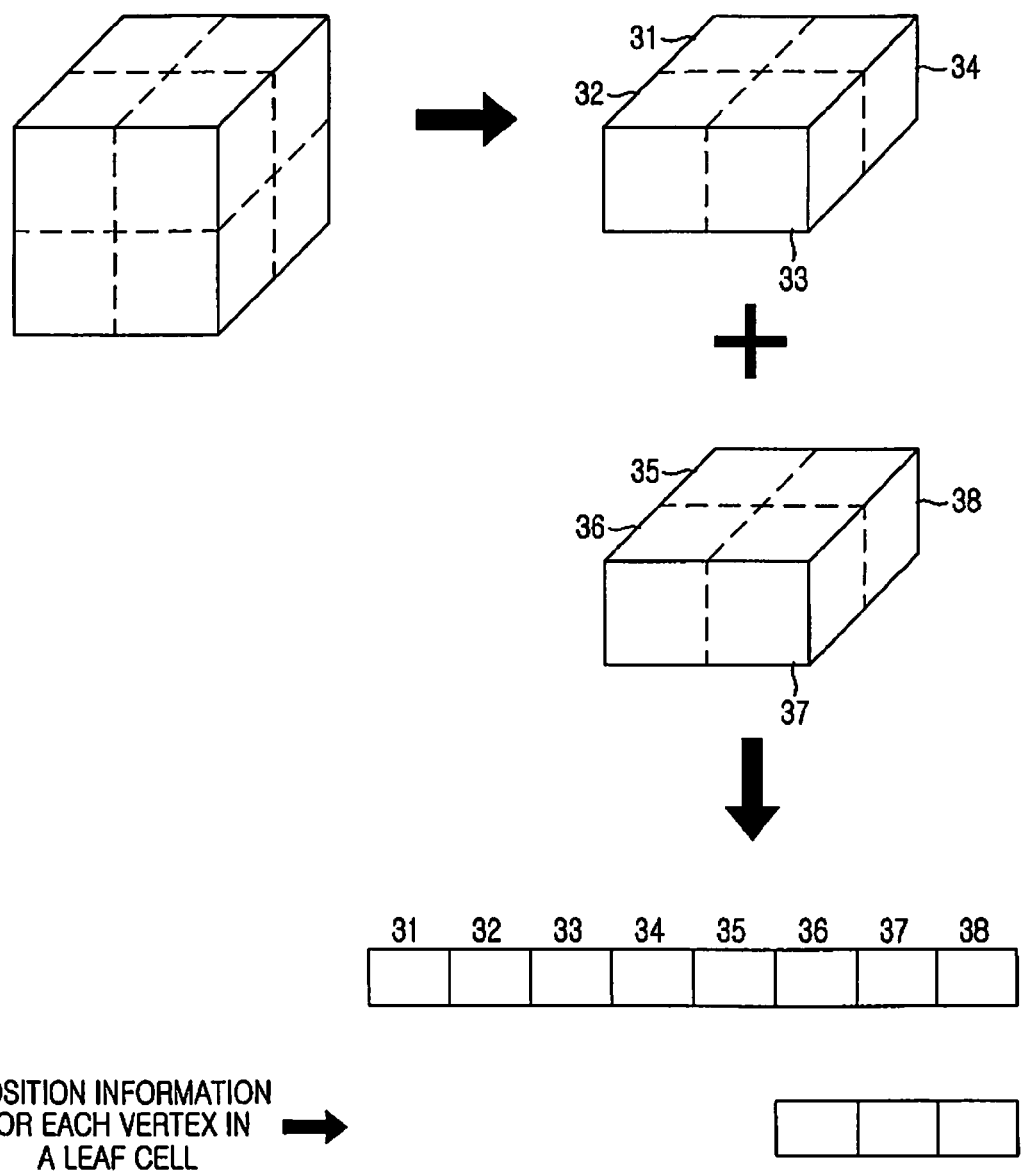
FIG. 4 is a view illustrating a bounding box divided by a method of coding 3D data according to an embodiment of the present invention, and an example of coding division information for each divided cell.

FIG. 4 illustrates a bounding box divided into cells by a method of coding 3D data according to an embodiment of the present invention, and illustrates coding of division information for each of the divided cells. When an octree generation for the bounding box is performed, the bounding box is divided into eight cells 31 to 38, wherein the eight cells are separately illustrated in units of four cells in order to show the eight cells through use of drawings expressed in a plane. Also, information on whether or not the divided eight cells 31 to 38 includes more than a predetermined number of vertices (e.g., more than one vertex) may be coded with 8 bits by using each allocated bit. In addition, if a leaf cell is not in the final dividing level, the position of a vertex included in the leaf cell may be coded with 3 bits, i.e., the required number of binary digits for counting to 8, representing the positions of eight cells.

FIGS. 5A to 5D sequentially illustrate front views of the bounding box 11 which is divided for forming an adaptive octree according to an exemplary embodiment of the present invention, and FIGS. 6A to 6D illustrate the results of coding the divided cells, corresponding to FIGS. 5A to 5D. Because FIGS. 5A to 5D only illustrate the front view of the bounding box, only 4 of the eight cells that are created at each division are illustrated. Accordingly, FIGS. 6A to 6D only illustrate a 4 bit code information and 2 bit position information, rather than the 8 bit coding information and 3 bit position information as illustrated in FIG. 4.

Figure 5A:
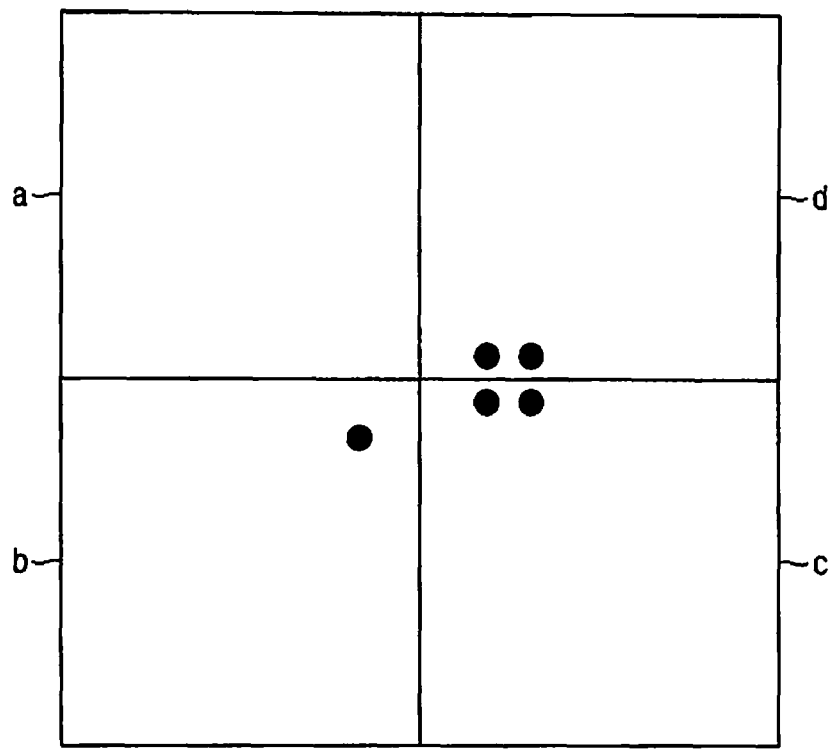
FIGS. 5A to 5D are view sequentially illustrating front views of a bounding box divided by a method of coding 3D data according to an embodiment of the present invention.

Referring to FIG. 5A, a bounding box is divided into four cells a, b, c, and d, and cells a, b, c, and d include 0, 1, 2, and 2 vertices, respectively. Therefore, cell b is appointed as a leaf cell, and each of cells c and d is subdivided into four cells (see FIG. 5B). That is, cell c is divided into cells c1, c2, c3, and c4, and cell d is divided into cells d1, d2, d3, and d4. Additionally, as described above, because cell b is a leaf cell, and cells c and d are to be further divided, cell b is not in a final dividing level.

Figure 5B:
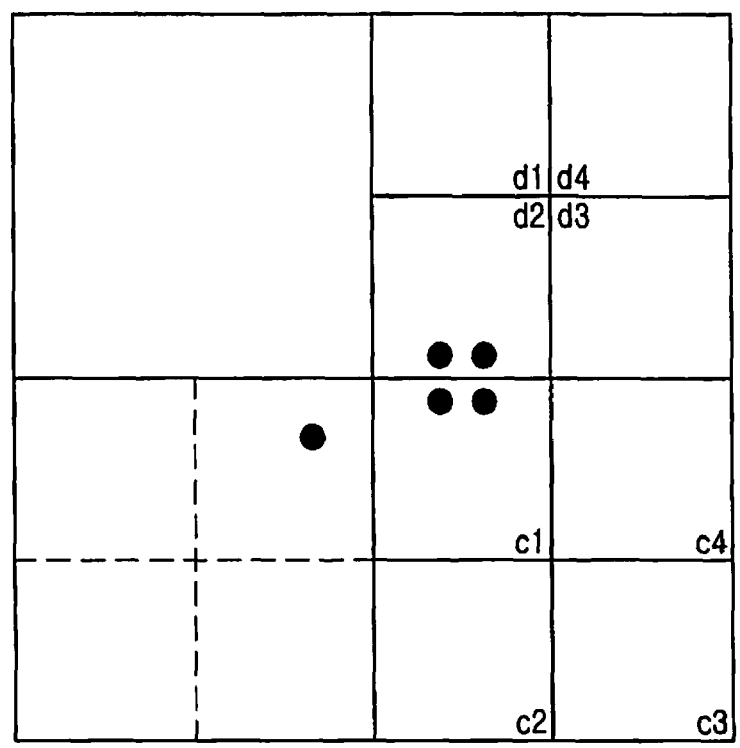
Figure 5C:
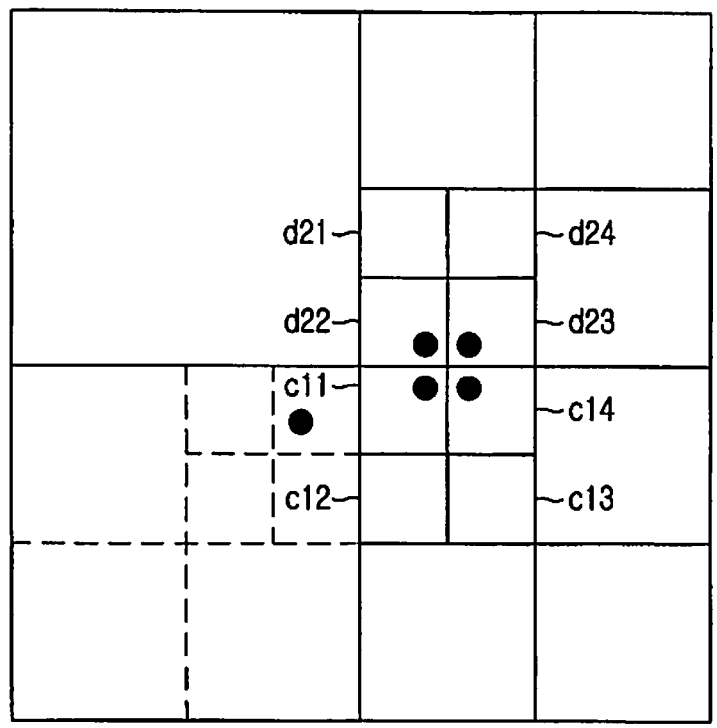
Figure 5D:
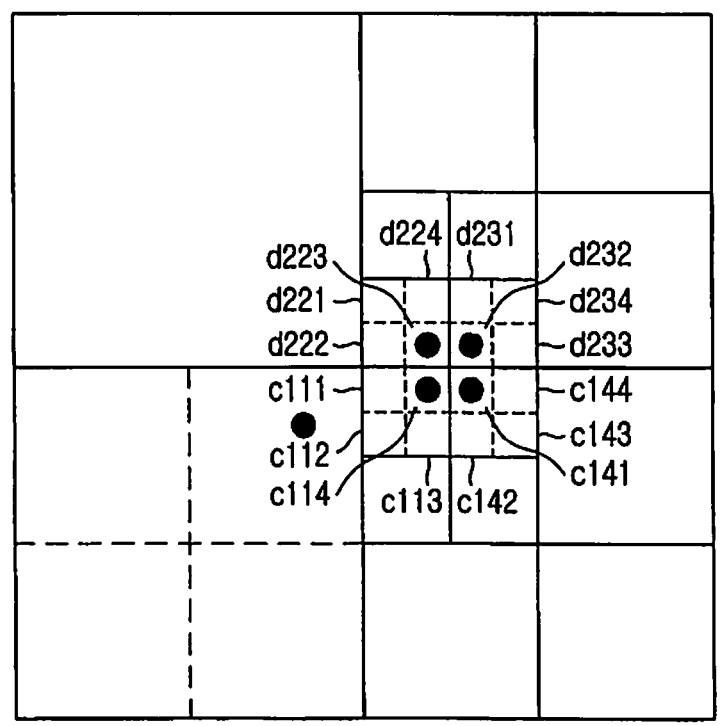

Referring to FIG. 5B, among the divided cells, cells c1, c2, c3, and c4 include 2, 0, 0, and 0 vertices, respectively, and cells d1, d2, d3, and d4 include 0, 2, 0, and 0 vertices, respectively. Accordingly, cell c1 is further divided into cells c11, c12, c13, and c14, and cell d2 is further divided into cells d21, d22, d23, and d24 (see FIG. 5C). Referring to FIG. 5C, because cells c11, c12, c13, and c14 include 1, 0, 0, and 1 vertices, respectively, and cells d21, d22, d23, and d24 include 0, 1, 1, and 0 vertices, respectively, the division operation does not need to be performed any further. Basically, in FIG. 5C, step 120 of FIG. 1 for forming an adaptive octree is completed.

Referring back to FIG. 1, in step 130, division information on each cell is coded from the formed adaptive octree. More specifically, in step 130, when a divided cell includes two or more vertices, a corresponding bit of that cell is set to 1. However, when a divided cell includes only one vertex, a corresponding bit is set to 1, and bits included in any lower level division are set to all 0's. In addition, in step 130, when a divided cell contains no vertex, the corresponding bit is set to 0. Examples, of coding are illustrated in FIGS. 6A to 6D.

Referring to FIG. 6A, bits allocated to cells a, b, c, and d in FIG. 5A are set to 0, 1, 1, and 1, respectively. That is, in FIG. 6A, the code 0, 1, 1, and 1, represents that cell a includes 0 vertices, cell b includes 1 vertex, cell c includes 2 vertices, and cell d includes 2 vertices.

Referring back to FIG. 1, using the examples of FIGS. 5A to 5B and 6A to 6B, it is determined that cell b is a leaf cell in step 140, because it includes only one vertex. Further, the four bits corresponding to the lower level of cell b, which is a leaf cell, are set to all 0's, so that coding of a leaf cell is performed in step 160. In step 170, it is determined if cell b is in a final dividing level. However, because cells c and d will be further divided, cell b is not in the final dividing level, and coding position information is performed for the vertex in cell b in step 180. That is, the position of the vertex included in cell b is expressed with 2 bits. More specifically, as the cells are further divided, because the vertex included in cell b is positioned, for example, in the fourth cell within cell b, the 2 bits are set to "11," which indicates 4, the position of a subcell where the vertex is included in cell b. This is illustrated in FIG. 6B, where the coding information of the lower level cells (b1, b2, b3, and b4) of cell b are 0, 0, 0, and 0, and the position information is indicated as "11", i.e., a fourth cell.

In FIGS. 5A to 5D, the order indicating the positions of cells are set, for example, in the sequence of a left upper portion represented by "00", a left lower portion represented by "01", a right lower portion represented by "10", and a right upper portion represented by "11", through which it is illustrated that the vertex included in cell b is positioned, for example, in the fourth cell. However, the present invention is not limited thereto, and the order indicating the positions of cells may be set in various schemes.

Referring back FIGS. 5B and 6B, with respect to cells c and d, which are not leaf cells, because processing of all cells is not completed, coding is again performed in step 130. That is, bits allocated to cells c1, c2, c3, and c4 subdivided from cell c are set to 1, 0, 0, and 0, respectively, and bits allocated to cells d1, d2, d3, and d4 subdivided from cell d are set to 0, 1, 0, and 0, respectively.

Referring back to FIG. 1, in step 140 it is determined if each of cells c1 and d2 is a leaf cell. However, because cells c1 and d2 are not leaf cells, the coding operation of step 130 is again performed via step 170. Referring to FIGS. 5C and 6C, in step 130, bits allocated to cells c11, c12, c13, and c14 subdivided from cell c1 are set to 1, 0, 0, and 1, respectively, and bits allocated to cells d21, d22, d23, and d24 subdivided from cell d2 are set to 0, 1, 1, and 0, respectively.

In step 140, it is determined if each of cells c11, c14, d22, and d23 is a leaf cell. Because it is now determined that each of cells c11, c14, d22, and d23 is a leaf cell as a result of step 140, 4 bits corresponding to the lower level of each cell c11, c14, d22, and d23, each of which is a leaf cell, are set to all 0's in step 160 (See FIGS. 5D and 6D). That is, referring to FIGS. 5D and 6D, the bits representing the lower level cells c111, c112, c113, and c114, c141, c142, c143, and c144, d221, d222, d223, and d224, and d231, d232, d233, and d234 are all set to 0. Then, in step 170, it is determined that each of cells c11, c14, d22, and d23 is not in the final level, and 2 bits indicating position information are inserted in step 180, i.e., the position information is set as "11", "00", "10", and "01", respectively.

Upon the completion of the coding in FIG. 6D, coding of geometry data included in 3D data can be completed.

In addition, the cells' levels indicating division ranks may be used as context for coding geometry data. That is, by taking the relation between the upper level and the lower level into consideration, and applying a probability of distribution between levels, it can be estimated if a vertex is to be included in the lower level. Then, it is determined if the result of the estimation is accurate, and the result may be coded.

Figure 7:
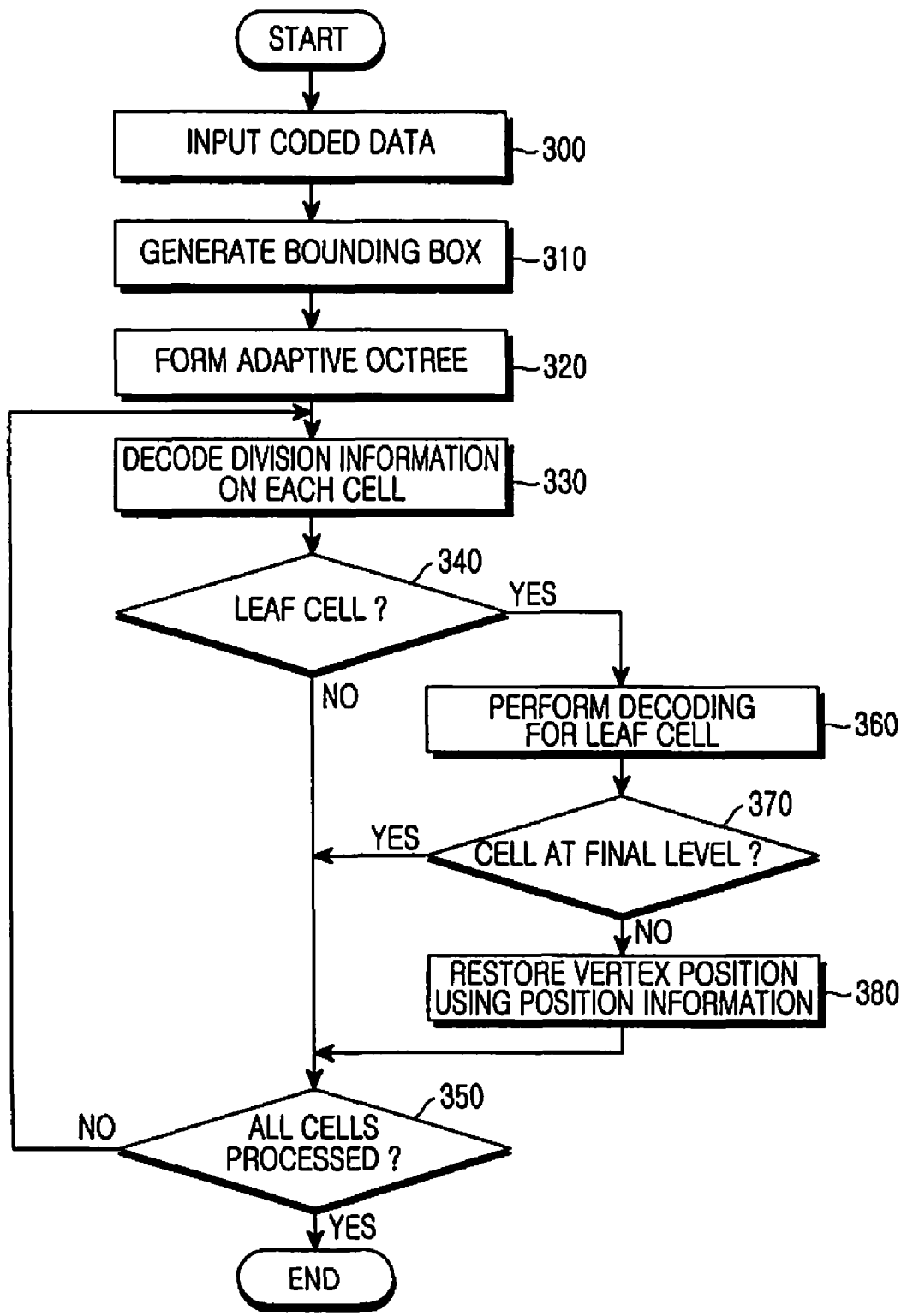
FIG. 7 is a flowchart illustrating a method for decoding 3D data according to an embodiment of the present invention.

FIG. 7 is a flowchart illustrating a method for decoding 3D data expressed by a mesh model according to an embodiment of the present invention.

In step 300, coded 3D data is received by a receiver such as mobile terminal. The 3D data may be data expressed by a mesh model, and includes geometry data. In step 310, a bounding box is restored from the coded 3D data received in step 300, based on information on a reference point and a size of the bounding box include in the coded 3D data.

In step 320, an adaptive octree of the bounding box is restored based on information on the adaptive octree inserted in a coding process. In a step of forming an adaptive octree in the coding process, information indicating whether an octree of cells is generated successively from an upper layer to a lower level is inserted. Therefore, in step 320, an octree is restored successively from the upper layer to the lower layer based on the information indicating whether an octree is generated.

In step 330, vertices included in geometry data are restored from coding information on divided cells in the octree. In step 340, it is determined if each cell corresponds to a leaf cell.

More specifically, in step 330, the restoration is performed such that cells corresponding to a lower level of a bit allocated to a cell include no vertex when the value included in the allocated bit is 0, and cells corresponding to a lower level of a bit allocated to a cell include at least one vertex when the value included in the allocated bit is 1. Thereafter, in step 340, when the value included in the bit allocated to a cell is 1, it is determined if the values of bits allocated to its lower cells are all 0's, thereby determining if the cell in process of decoding is a leaf cell. In step 340, if at least one bit among bits allocated to the lower cells has a value of 1, it is determined that the corresponding cell is not a leaf cell, and step 350 is performed. In contrast, when it is determined in step 340 that a cell is a leaf cell, decoding the cell is performed in step 360.

Because each cell is divided into equal-sized cells in the coding process, when the level of each divided cell is identified, the position of the cell can be identified. The position of a vertex included in each cell can be restored using the reference point of the cell including the vertex. Accordingly, a vertex included in the geometry data is restored in step 330.

In step 370, it is determined if a cell determined as a leaf cell is in a final dividing level, and step 380 is performed when the cell is not in the final level. In step 380, the position information of the leaf cell, which has been inserted in the coding process, and a vertex is restored such that the vertex is positioned at a region corresponding to the position information.

In step 350, it is determined if all divided cells have been decoded. Step 330 is again performed on cells for which decoding has not been completed, and the decoding process is terminated when decoding all cells has been completed.

In addition, when context information on the level of each cell is inserted in the coding process, the context information may be used to perform decoding for the level of each cell. That is, using a result of an estimation for a relation between the upper level and the lower level, a cell of a lower level can be identified and used for the restoration.

According to the methods for coding and decoding 3D data based on embodiments of the present invention, a reduced size coded data of 3D data, which is expressed by a mesh, model is provided. Accordingly, it is possible to transmit precise 3D data through a wireless communication channel with limited resources, and even a portable terminal incapable of supporting a large number of operations can decode 3D data.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for coding and transmitting geometry data included in three-dimensional (3D) data expressed by a mesh model in a transmitting apparatus, the method comprising:
    generating, by a processor, a bounding box including at least one vertex of the 3D data based on information included in the geometry data;
    dividing the bounding box into a plurality of partitions having an equal size;
    identifying a number of vertices included in each of the divided partitions;
    appointing a divided partition as a leaf cell based on the identified number of vertices included in the divided partition;
    coding, by an encoder, the geometry data using information on the dividing of the bounding box, information on the vertices included in each of the divided partitions, and information indicating a position of a vertex included in the leaf cell; and
    transmitting, by a transmitter, the encoded geometry data to a receiving device.

2. The method of claim 1, further comprising:
    subdividing a divided partition into a plurality of sub-partitions based on the identified number of vertices included in the divided partition;
    identifying a number of vertices included in each of the subdivided sub-partitions; and
    appointing a subdivided sub-partition as a leaf cell based on the identified number of vertices included in the subdivided sub-partition.

3. The method of claim 2, wherein subdividing the divided partition is repeated a predetermined number of times.

4. The method of claim 1, wherein, when the divided partition includes less than two vertices, the divided partition is appointed as the leaf cell.

5. The method of claim 1, wherein the geometry data is coded using a cell's level, which indicates a division rank, as a context.

6. The method of claim 1, wherein the information on the division of the bounding box includes information indicating a level generated according to a step-by-step division of the bounding box.

7. The method of claim 1, wherein the information on the vertices included in each of the divided partitions includes information indicating if each of the divided partitions includes vertices greater than a predetermined number of vertices, or information indicating if each of the divided partitions includes no vertex.

8. The method of claim 1, wherein the information indicating the position of the vertex included in the leaf cell includes information indicating a partition in which the vertex included in the leaf cell is positioned among partitions divided at a lower level.

9. The method of claim 1, wherein dividing the bounding box comprises dividing the bounding box by applying an octree to the bounding box.

10. The method of claim 1, wherein identifying the number of vertices included in each of the divided partitions comprises determining whether each of the divided partitions includes vertices greater than a predetermined number of vertices.

11. A method for receiving and decoding geometry data included in three-dimensional (3D) data expressed by a mesh model by a receiving apparatus, the method comprising:
    receiving, by the receiving apparatus, encoded geometry data transmitted from an encoding apparatus;
    decoding, by a decoder, a bounding box generated during a coding process of the geometry data;
    identifying, by a processor, information on divisions of the bounding box;
    identifying whether a specific partition of the bounding box has been divided into a lower level or corresponds to a leaf cell;
    subdividing the specific partition that has been divided into the lower level;

restoring a vertex included in the leaf cell, based on information indicating a position of the vertex included in the leaf cell; and restoring the geometry data including the information on the position of the vertex based on information on a vertex included in each of divided partitions of the bounding box and a position of each the divided partitions.

12. The method of claim 11, wherein a reference point of either the leaf cell or a partition divided up to a lowest level is appointed as a vertex position.

13. The method of claim 11, further comprising:
acquiring context information on a level of a partition, which is been inserted to the geometry data in the coding process; and
restoring the geometry data based on the context information.

14. A method for coding and transmitting geometry data that is included in three-dimensional (3D) data expressed by a mesh model by a transmitting apparatus, and receiving and decoding the coded geometry data based on the coding method by a receiving apparatus, the coding method comprising:

generating, by a processor of the transmitting apparatus, a bounding box including at least one vertex of the 3D data based on information included in the geometry data;
dividing the bounding box into a plurality of partitions having an equal size;
identifying a number of vertices included in each the divided partitions;
subdividing or appointing a divided partition as a leaf cell based on the identified number of vertices included in the divided partition; and
coding the geometry data using information on the dividing of the bounding box, information on the vertices included in each of the divided partitions, and information indicating a position of a vertex included in the leaf cell, wherein the decoding method comprises:
decoding the bounding box generated in the coding process;
identifying, by a processor of the receiving apparatus, the information on the dividing of the bounding box;
identifying whether a specific partition has been divided into a lower level or corresponds to a leaf cell;
subdividing the specific partition that has been divided into the lower level;
restoring a vertex included in the leaf cell based on information indicating the position of the vertex included in the leaf cell; and
restoring the geometry data including the information on the position of the vertex based on information on a vertex included in each of the divided partitions and a position of each of the divided partitions.

* * * * *